C. F. TROTTNOW.
VALVE SPRING LIFTER FOR INTERNAL COMBUSTION ENGINES.
APPLICATION FILED AUG. 5, 1920.
1,413,812.
Patented Apr. 25, 1922.
2 SHEETS—SHEET 2.
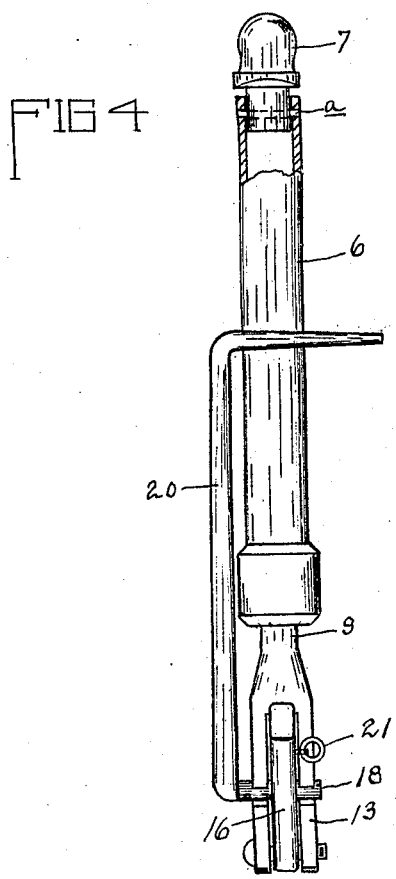

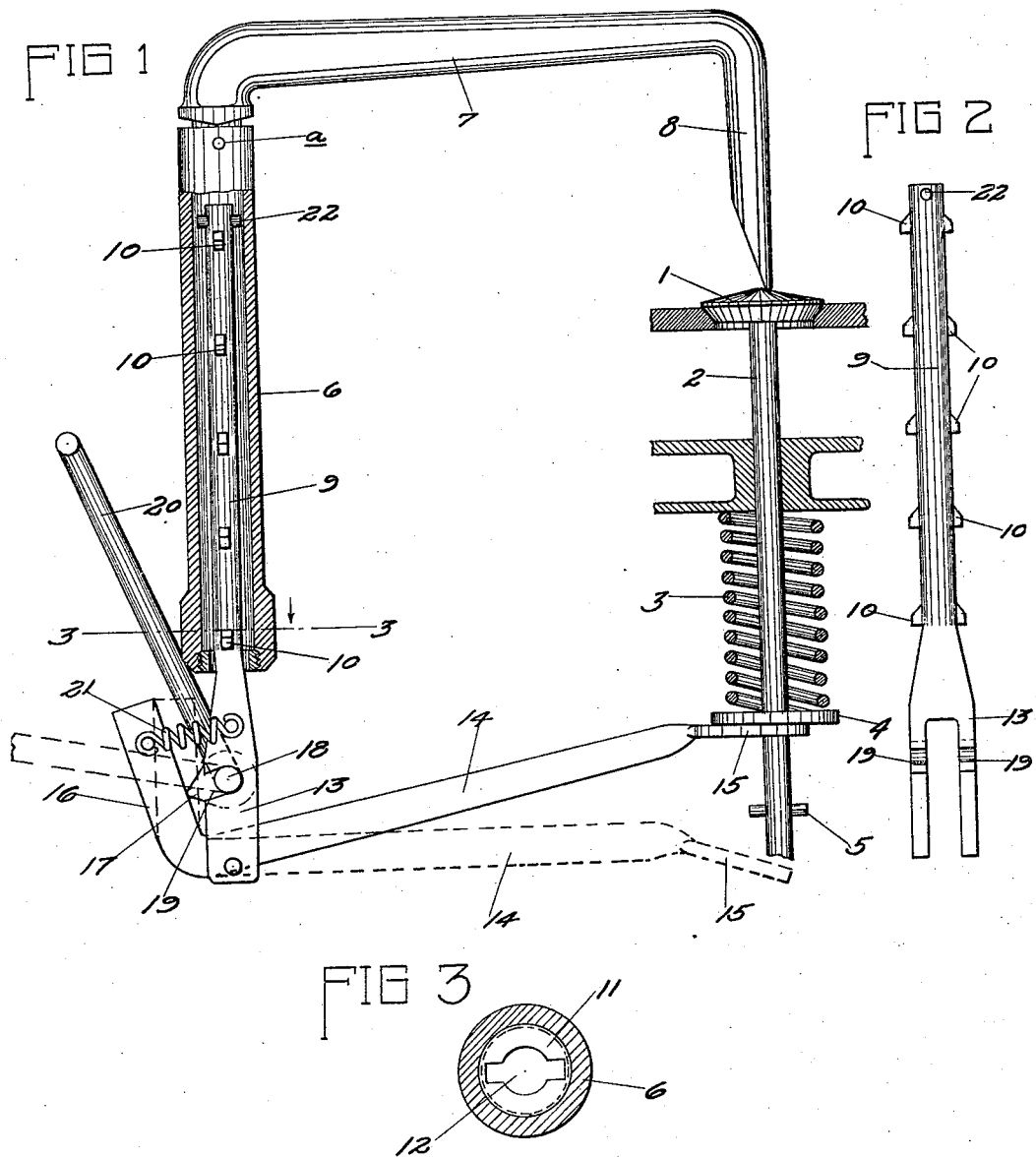

UNITED STATES PATENT OFFICE.

CARL F. TROTTNOW, OF ROCK ISLAND, ILLINOIS.

VALVE-SPRING LIFTER FOR INTERNAL-COMBUSTION ENGINES.

1,413,812.    Specification of Letters Patent.    Patented Apr. 25, 1922.

Application filed August 5, 1920. Serial No. 401,298.

*To all whom it may concern:*

Be it known that I, CARL F. TROTTNOW, a citizen of the United States, residing at Rock Island, in the county of Rock Island and State of Illinois, have invented certain new and useful Improvements in Valve-Spring Lifters for Internal-Combustion Engines, of which the following is a specification.

My invention has reference to devices for compressing the valve springs of internal combustion engines, and has for its purpose to provide a simple and efficient tool of that kind, which will not be in the way of the operator, and which can be readily adjusted to different lengths, for use with engines of varying sizes, or with differing lengths of valve stems.

In the drawings:

Fig. 1 is a view of the invention in side elevation, with some of the parts shown in vertical section.

Fig. 2 is a detail of the stem 9.

Fig. 3 is a cross-section on the broken line 3—3 of Fig. 1.

Fig. 4 is an end view of the invention.

The device is shown in position, in use with some of the usual parts of an engine cylinder, consisting of a valve 1, stem 2, spring 3, washer 4 and pin 5. 6 is a cylindrical member, provided at its upper end with a bar 7, ending in an angular pin 8, adapted for engagement with the upper face of a valve. Slidable within the cylinder 6 is a stem 9, provided at intervals with pairs of projections 10, adapted for support upon a collar 11 fixed in the lower end of the part 6, and provided with a slotted opening 12 for the passage of the lugs 10.

At its lower end the stem 9 is formed into a forked hanger 13, in the lower end of which is pivoted an arm 14, provided at its end with a bifurcated plate 15, for engagement with the lower face of the washer 4. The other end of the arm 14 is bent upwardly as at 16, which is capable of being forced outwardly by an eccentric 17, fixed on a pivot 18, held in slotted openings 19 in the hanger 13. The pivot 18 is extended at one end into a handle 20, by means of which the eccentric 17 can be rocked to force the arm 16 outwardly or permit the return movement thereof. Accidental release of the eccentric is prevented by means of a coiled spring 21, secured at one end to the arm 16 and at the other end to the hanger 13, which spring holds the arm 16 at all times in operating contact with the eccentric.

To use the tool, the stem 9 is inserted in the cylinder 6 to a desired height, the lugs 10 passing through the slotted ends of the opening 12. The pin 8 is then positioned on the valve 1, and the stem 9 given a quarter-turn, bringing one pair of the lugs 10 into engagement with the collar 11, and holding the stem against release from the cylinder. The same movement brings the arm 14 into alignment with the bar 7, permitting the fork 15 to be positioned beneath the washer 4. The handle 16 is then forced upwardly, moving the arm 16 outwardly, and compressing the spring 3, as shown in Fig. 1. The pin 5 can then be released and the parts of the valve removed for repairs.

The stem 9 is provided at its upper end with a pin 22, at right angles with the lugs 10, which pin acts as a guide, to hold the stem in parallel position with relation to the walls of the cylinder 6. The bar 7 may also have a pivotal connection with the part 6, as shown at *a*, permitting a limited outward movement of the lower end of the cylinder, in engaging the fork 15, or disengaging the same. This enables the fork to clear the stem 2 so as to be swung to either side thereof in releasing the fork, or to be moved into position for engagement with the washer 4.

When in position on a valve the tool has a pivotal support which enables it to be turned to one side or the other, so as to be in the way as little as possible.

It will be obvious that the length of the tool can be changed, at will, by extension of the stem 9, or contraction thereof within the cylinder 6.

What I claim as my invention, and desire to secure by Letters Patent, is:

1. A device of the class described, comprising a cylindrical member, provided with a valve-engaging arm; a member telscopically movable in said cylindrical member and provided with means for holding the same in adjusted positions therein; a lever fulcrumed in the end of said movable member, provided at one of its ends with means for engagement with the valve devices of an engine; and means for actuating said lever to cause a compression of the tension portion of said devices.

2. A device of the class described, comprising a cylindrical member, provided at one of its ends with a valve-engaging arm; a member telescopically movable in the opposite end of said cylindrical member, and provided with means for arresting the movement thereof at predetermined points; a lever fulcrumed in the outer end of said telescopic member, provided with means for engagement with the tension device of a valve; and an eccentric device carried by said telescopic member, capable of actuating said lever to cause a compression of said tension devices.

3. A device of the class described, comprising a cylindrical member provided with a valve engaging arm at one of its ends and a suitably apertured collar at its opposite end; a stem provided with pairs of projections, capable of holding said stem in adjusted positions in said cylinder; a hanger on the end of said stem; a lever fulcrumed in said hanger, and adapted to be brought into spaced-apart alignment with said arm by rotation of said stem; and means for imparting a limited movement to the operative end of said lever in the direction of said arm, the movement of said stem to bring said parts into alignment operating to bring a pair of said projections into engagement with said collar, to hold said stem in place.

4. A device of the class described, comprising a cylindrical member, provided with a slotted opening in one of its ends; a valve-engaging arm having a pivotal connection with the opposite end of said cylinder; a stem slidable in said cylinder and provided with pairs of projections capable of passing through said opening when said stem is in a desired position, but engaging the end of said cylinder upon a partial rotation of the stem, to hold the same from release; a lever supported by the outer end of said stem, one end of which lever is adapted for engagement with the tension device of a valve; and means carried by said stem for actuating said lever, in opposition to said arm, to cause a compression of said tension device.

5. A device of the class described, comprising a cylindrical member, provided with a slotted plate at one of its ends; a valve engaging arm connected with the opposite end thereof; a stem rotatably held in said cylinder and provided with a pair of lugs adapted to pass through said plate and engage the inner face thereof upon a partial rotation of said stem; a lever fulcrumed in the outer end of said stem, one end of which is adapted for engagement with the valve-spring of an engine; and means for actuating said lever, to cause a compression of said spring.

6. A device of the class described, comprising a cylindrical member, provided at one of its ends with a valve engaging arm; a member telescopically movable in said cylinder, and provided with means for arresting the movement thereof at predetermined points; a lever fulcrumed in the outer end of said telescopic member, provided with means for engagement with the valve-spring of an engine; an eccentric device carried by said telescopic member, capable of actuating said lever to cause a compression of said spring; and means for holding said lever and eccentric in operative engagement.

In testimony whereof I affix my signature.

CARL F. TROTTNOW.